(12) United States Patent
Nguyen et al.

(10) Patent No.: US 10,125,628 B2
(45) Date of Patent: Nov. 13, 2018

(54) SYSTEMS AND METHODS FOR POWER GENERATION SYNCHRONOUS CONDENSING

(71) Applicant: General Electric Company, Schenectady, NY (US)

(72) Inventors: Tho V. Nguyen, Cypress, TX (US); Douglas Jones, Bellaire, TX (US); Harley M. Ross, Pearland, TX (US); Vineet Sethi, Sugar Land, TX (US); Tuy C. Huynh, Sugar Land, TX (US)

(73) Assignee: General Electric Company, Schenectady, NY (US)

( * ) Notice: Subject to any disclaimer, the term of this patent is extended or adjusted under 35 U.S.C. 154(b) by 36 days.

(21) Appl. No.: 15/486,848

(22) Filed: Apr. 13, 2017

(65) Prior Publication Data
US 2018/0298777 A1   Oct. 18, 2018

(51) Int. Cl.
| | | |
|---|---|---|
| *F01D 15/10* | (2006.01) |
| *F02C 7/06* | (2006.01) |
| *F02C 3/04* | (2006.01) |
| *F02C 9/26* | (2006.01) |
| *F02C 7/32* | (2006.01) |
| *F01D 15/08* | (2006.01) |
| *H02P 9/04* | (2006.01) |
| *H02P 9/30* | (2006.01) |
| *F02C 7/27* | (2006.01) |
| *F01D 25/20* | (2006.01) |

(52) U.S. Cl.
CPC .......... *F01D 15/10* (2013.01); *F01D 15/08* (2013.01); *F01D 25/20* (2013.01); *F02C 3/04* (2013.01); *F02C 7/06* (2013.01); *F02C 7/27* (2013.01); *F02C 7/32* (2013.01); *F02C 9/26* (2013.01); *H02P 9/04* (2013.01); *H02P 9/30* (2013.01); *F05D 2220/32* (2013.01); *F05D 2240/35* (2013.01); *F05D 2240/60* (2013.01)

(58) Field of Classification Search
None
See application file for complete search history.

(56) References Cited

U.S. PATENT DOCUMENTS

| | | |
|---|---|---|
| 2,892,524 A | 6/1959 | Sinclair |
| 3,563,354 A | 2/1971 | Sigg |
| 3,589,488 A | 6/1971 | Clements |
| 3,733,095 A | 5/1973 | Sinclair et al. |

(Continued)

*Primary Examiner* — Tulsidas C Patel
*Assistant Examiner* — S. Mikailoff
(74) *Attorney, Agent, or Firm* — Eversheds Sutherland (US) LLP (57) ABSTRACT

The present application provides a power generation system. The power generation system may include a core turbine positioned about a core rotor shaft, a power turbine positioned about a power rotor shaft, a synchronous generator including a generator rotor shaft coupled to the power rotor shaft for rotation therewith, and an electronic controller in operable communication with the synchronous generator. The synchronous generator may be configured to generate reactive power for or absorb reactive power from an electric power grid when the power generation system operates in a reactive power mode. The electronic controller may be operable to cause the core rotor shaft to rotate when the power generation system operates in the reactive power mode.

15 Claims, 2 Drawing Sheets

(56) References Cited

U.S. PATENT DOCUMENTS

| | | | |
|---|---|---|---|
| 3,868,004 A | 2/1975 | Clements et al. | |
| 5,325,042 A | 6/1994 | Murugan | |
| 5,610,500 A | 3/1997 | Giberson | |
| 5,886,505 A | 3/1999 | Giberson | |
| 6,093,975 A | 7/2000 | Peticolas | |
| 6,897,577 B2 | 5/2005 | Weeber et al. | |
| 8,816,521 B2 | 8/2014 | Kleen et al. | |
| 2004/0008010 A1* | 1/2004 | Ebrahim | H02P 9/04 322/44 |
| 2006/0066113 A1* | 3/2006 | Ebrahim | H02P 9/04 290/52 |
| 2009/0096212 A1 | 4/2009 | Turner et al. | |
| 2012/0306458 A1 | 12/2012 | Fogarty et al. | |
| 2013/0241203 A1* | 9/2013 | Kleen | F01D 15/10 290/52 |
| 2015/0345385 A1* | 12/2015 | Santini | F01D 15/10 290/52 |
| 2016/0036230 A1 | 2/2016 | Day | |
| 2016/0105078 A1* | 4/2016 | Santini | F02C 7/36 290/52 |
| 2018/0142741 A1* | 5/2018 | Sethi | F16D 23/02 |
| 2018/0145620 A1* | 5/2018 | Zhang | H02P 9/04 |

\* cited by examiner

SYSTEMS AND METHODS FOR POWER GENERATION SYNCHRONOUS CONDENSING

TECHNICAL FIELD

The present application relates generally to gas turbine engines and more particularly relates to systems and methods for power generation synchronous condensing using a gas turbine engine and a synchronous generator.

BACKGROUND OF THE INVENTION

Synchronous condensers may be utilized in a wide variety of applications, such as power generation. Typically, synchronous condensers may be utilized to adjust conditions on an electric power distribution grid. Synchronous condensing may be necessary to produce reactive power (vars) in order to maintain the voltage to deliver active power (watts) through transmission lines. Motor loads and other loads may require reactive power to convert the flow of electrons into useful work. When there is insufficient reactive power, the voltage may sag and it may not be possible to push the power demanded by such loads through the transmission lines. A synchronous condenser may be a specialized motor with an unattached rotor shaft that spins freely during operation. The synchronous condenser may generate or absorb reactive power, as needed, to support the voltage and/or maintain a power factor on the electric power distribution grid.

In power generation systems, synchronous generators may be coupled to and driven by gas turbine engines or other types of power sources to produce electrical energy. In some cases, it may be desirable to use generators as synchronous condensers to generate reactive power for or absorb reactive power from the electric power grid. Various approaches exist for converting a synchronous generator to operate as a synchronous condenser. According to one approach, the synchronous generator may be decoupled from the turbine rotor shaft of the gas turbine engine, and a starting motor or other driving mechanism may be provided to accelerate the rotor shaft of the synchronous generator to an operational speed. Potential problems with this approach may include a high added cost of providing and powering the starting motor, a significant amount of time required to install the starting motor, and/or a limited amount of space in which the starting motor may be installed and operated. According to another approach, the rotor shaft of the synchronous generator may be coupled to the turbine rotor shaft of the gas turbine engine via a clutch, such as an automatic overriding clutch, which may allow the generator rotor shaft to rotate relative to the turbine rotor shaft. Although this approach may be suitable in certain applications, the added cost of the clutch may be significant, the clutch may present reliability issues over time, and/or a limited amount of space may not allow for use of the clutch. Still other approaches may utilize other mechanisms for driving the generator rotor shaft and/or coupling the generator rotor shaft to the turbine rotor shaft, which may increase the complexity of the system, increase the cost of the system, and/or present reliability issues over time.

There is thus a desire for improved systems and methods for power generation synchronous condensing using a gas turbine engine and a synchronous generator. Such systems and methods may enable synchronous condensing function while avoiding one or more of the above-described problems experienced with existing approaches. In particular, such systems and methods may allow the synchronous generator to operate as a synchronous condenser with no or minimal additional hardware. In this manner, synchronous condensing function may be provided, either upon original manufacture or as a retrofit, at no or minimal added cost. Furthermore, such systems and methods may eliminate the need for a clutch or other similar mechanism coupling the generator rotor shaft to the turbine rotor shaft and thus may avoid potential reliability issues associated therewith.

SUMMARY OF THE INVENTION

The present application thus provides a power generation system. The power generation system may include a core turbine positioned about a core rotor shaft, a power turbine positioned about a power rotor shaft, a synchronous generator including a generator rotor shaft coupled to the power rotor shaft for rotation therewith, and an electronic controller in operable communication with the synchronous generator. The synchronous generator may be configured to generate reactive power for or absorb reactive power from an electric power grid when the power generation system operates in a reactive power mode. The electronic controller may be operable to cause the core rotor shaft to rotate when the power generation system operates in the reactive power mode.

The present application further provides a method for operating a power generation system. The method may include the steps of providing a gas turbine engine including a core turbine positioned about a core rotor shaft, and a power turbine positioned about a power rotor shaft, and operating a synchronous generator as a synchronous condenser to generate reactive power for or absorb reactive power from an electric power grid. The synchronous generator may include a generator rotor shaft coupled to the power rotor shaft for rotation therewith. The method also may include the step of directing, via an electronic controller, the core rotor shaft to rotate while the synchronous generator operates as the synchronous condenser.

The present application further provides a power generation system. The power generation system may include a gas turbine engine, a synchronous generator, and an electronic controller in operable communication with the synchronous generator. The gas turbine engine may include a core turbine positioned about a core rotor shaft, a power turbine positioned about a power rotor shaft, one or more bearings supporting the core rotor shaft or the power rotor shaft, and a lubricating oil pump configured to deliver lubricating oil to the one or more bearings. The synchronous generator may include a generator rotor shaft coupled to the power rotor shaft for rotation therewith, and the synchronous generator may be configured to generate reactive power for or absorb reactive power from an electric power grid when the power generation system operates in a reactive power mode. The electronic controller may be operable to cause the lubricating oil pump to deliver the lubricating oil to the one or more bearings when the power generation system operates in the reactive power mode and to cause the core rotor shaft to rotate when the power generation system operates in the reactive power mode.

These and other features and improvements of the present application will become apparent to one of ordinary skill in the art upon review of the following detailed description when taken in conjunction with the several drawings and the appended claims.

DETAILED DESCRIPTION

Figure 1:
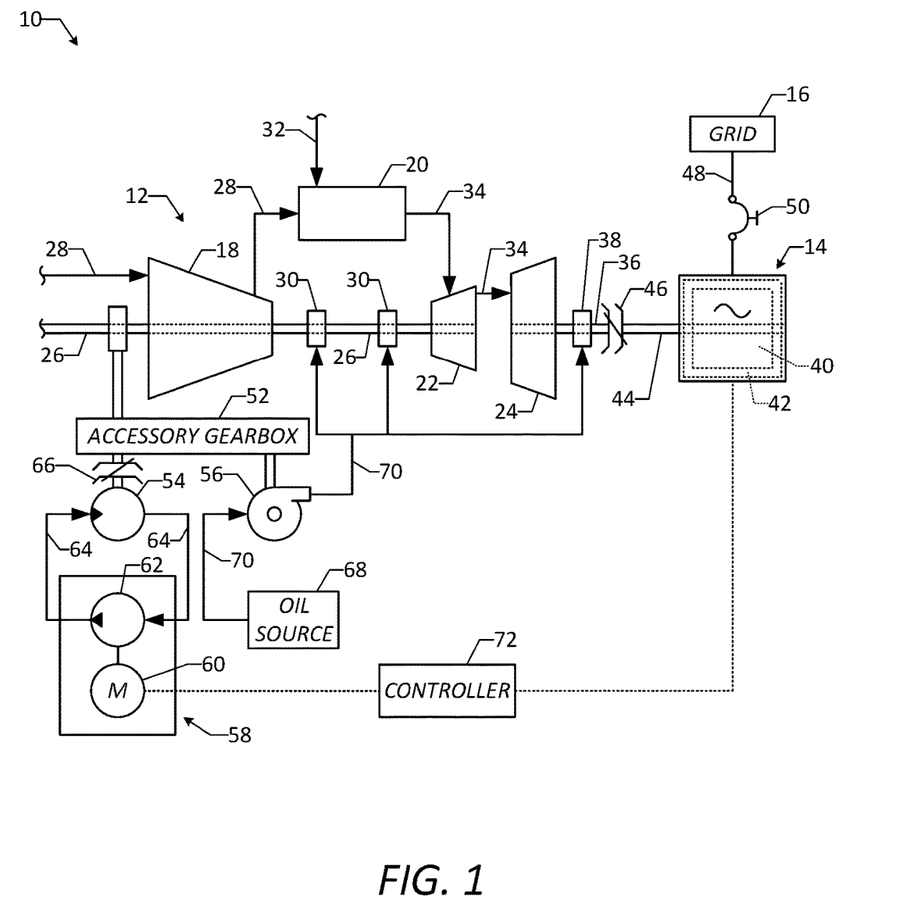
FIG. 1 is a schematic diagram of a gas turbine engine system including a gas turbine engine and a synchronous generator that may operate as a synchronous condenser.

Referring now to the drawings, in which like numerals refer to like elements throughout the several views, FIG. 1 shows a schematic diagram of a power generation system 10 as may be used herein. The power generation system 10 may include a gas turbine engine 12 coupled to a synchronous generator 14 (which also may be referred to as a "synchronous condenser"). As described below, the power generation system 10 may be operated in an active power mode or a reactive power mode. In the active power mode, the system 10 may provide active power (watts) to an electric power grid 16, and in the reactive power mode, the system 10 may generate reactive power (vars) for or absorb reactive power from the electric power grid 16. In this manner, the synchronous generator 14 may operate as a synchronous generator in the active power mode and may operate as a synchronous condenser in the reactive power mode.

The gas turbine engine 12 may be an aeroderivative TM2500, LM2500, LM6000, or LMS100 gas turbine engine, although other types of gas turbine engines may be used. As shown, the gas turbine engine 12 may include a compressor 18, a combustor 20, a core turbine 22 (which also may be referred to as a "high pressure turbine"), and a power turbine 24 (which also may be referred to as a "free turbine" or a "low pressure turbine"). The compressor 18 may be positioned about a core rotor shaft 26 and configured to receive an incoming flow of air 28. The core rotor shaft 26 may be rotatably supported by one or more bearings 30, as shown. The compressor 18 may include a number of stages each having a number of stator vanes positioned about the core rotor shaft 26 and a number of blades configured to rotate with the core rotor shaft 26. The compressor 18 may be configured to compress the incoming flow of air 28 and to deliver the compressed flow of air 28 to the combustor 20. The combustor 20 may be configured to mix the compressed flow of air 28 with a pressurized flow of fuel 32 received from a fuel source and to ignite the mixture to create a flow of combustion gases 34. Although only a single combustor 20 is shown, the gas turbine engine 12 may include any number of combustors 20. The combustor 20 may be configured to deliver the flow of combustion gases 34 to the core turbine 22. The core turbine 22 may include a number of stages each having a number of stator vanes positioned about the core rotor shaft 26 and a number of blades configured to rotate with the core rotor shaft 26. The core turbine 22 may be driven by the flow of combustion gases 34 so as to produce mechanical work and may direct the flow of combustion gases 34 to the power turbine 24. The power turbine 24 may be positioned about a power rotor shaft 36 and configured to receive the flow of combustion gases 34 from the core turbine 22. The power rotor shaft 36 may be rotatably supported by one or more bearings 38, as shown. The power turbine 24 may include a number of stages each having a number of stator vanes positioned about the power rotor shaft 36 and a number of blades configured to rotate with the power rotor shaft 36. The power turbine 24 may be driven by the flow of combustion gases 34 so as to produce mechanical work. The mechanical work produced by the power turbine 24 may drive the synchronous generator 14 when the power generation system 10 is operated in the active power mode.

The synchronous generator 14 may include a generator rotor 40 mounted within a generator stator 42, and a generator rotor shaft 44 coupled to the generator rotor 40 and configured to rotate therewith. The generator rotor 40 may be wrapped in field windings, and the generator stator 42 may be wrapped in armature windings. The synchronous generator 14 may be coupled to the gas turbine engine 12 via a clutch 46. In particular, the clutch 46 may couple the generator rotor shaft 44 to the power rotor shaft 36, as shown. The clutch 46 may be configured such that the generator rotor shaft 44 may be driven by and rotate with the power rotor shaft 36 when the power generation system 10 is operated in the active power mode, and such that the generator rotor shaft 44 may rotate relative to the power rotor shaft 36 when the power generation system 10 is operated in the reactive power mode. The clutch 46 may be an automatic overriding clutch, although other types of clutches may be used. The synchronous generator 14 may be in communication with the electric power grid 16 via a power line 48 and a generator circuit breaker 50. When the power generation system 10 is operated in the active power mode, the synchronous generator 14 may operate as a synchronous generator and provide active power to the electric power grid 16. When the power generation system 10 is operated in the reactive power mode, the synchronous generator 14 may operate as a synchronous condenser and generate reactive power for or absorb reactive power from the electric power grid 16.

As shown, the power generation system 10 may include an accessory gearbox 52 configured to drive one or more accessory features of the gas turbine engine 12, the synchronous generator 14, and/or other portions of the system 10. For example, the accessory gearbox 52 may be used to facilitate startup of the gas turbine engine 12 and/or to facilitate delivery of lubricating oil to various portions of the gas turbine engine 12. As shown, the power generation system 10 may include a hydraulic motor 54 mounted to one pad of the accessory gearbox 52 and a lubricating oil pump 56 mounted to another pad of the accessory gearbox 52.

The hydraulic motor 54 may be in communication with a motor-pump assembly 58 configured to drive the hydraulic motor 54. As shown, the motor-pump assembly 58 may include an electric motor 60 coupled to and configured to drive a hydraulic pump 62. When the hydraulic pump 62 is driven by the electric motor 60, a flow of hydraulic fluid 64 may circulate between the hydraulic pump 62 and the hydraulic motor 54 such that the motor 54 is driven by the pump 62. The hydraulic motor 54, in turn, may drive the accessory gearbox 52 which may operate the one or more accessories mounted thereto. The accessory gearbox 52 may facilitate startup of the gas turbine engine 12 by rotating the core rotor shaft 26 to an igniting speed. As shown, a clutch 66 may be positioned between the hydraulic motor 54 and the core rotor shaft 26. The clutch 66 may be configured to disengage when the speed of the core rotor shaft 26 is greater than the speed of the hydraulic motor 54. In particular, the clutch 66 may be configured to disengage when the speed of the core rotor shaft 26 reaches a predetermined windmilling speed, which may be between 1000 rpm and 2500 rpm. The accessory gearbox 52 also may drive the lubricating oil pump 56.

The lubricating oil pump 56 may be in communication with a lubricating oil source 68 and configured to pump and receive a flow of lubricating oil 70 therefrom. Various types of lubricating oil may be used. As shown, the lubricating oil pump 56 also may be in communication with the bearings 30 supporting the core rotor shaft 26 and the bearings 38 supporting the power rotor shaft 36. When the lubricating oil pump 56 is driven by the accessory gearbox 52, the lubricating oil pump 56 may deliver the lubricating oil 70 to the bearings 30, 36 in order to lubricate and remove heat from the bearings 30, 36 while the core rotor shaft 26 and the power rotor shaft 36 rotate. The lubricating oil pump 56 may be a mechanical pump, although other types of pumps may be used.

As shown, the power generation system 10 also may include an electronic controller 72 in operable communication with various components of the system 10. For example, the controller 72 may be in operable communication with the electric motor 60 and configured to control an operating state (i.e., an on state or an off state) and/or an operating speed of the motor 60. In this manner, the controller 70 may be operable to control the hydraulic motor 54 and the accessory gearbox 52, for example, during startup of the gas turbine engine 12, and to control the lubricating oil pump 56 for delivery of the lubricating oil 70 during operation of the gas turbine engine 12. The controller 72 also may be in operable communication with the synchronous generator 14 and configured to control operations thereof. In this manner, the controller 72 may be operable to monitor and/or control the active power generated by the synchronous generator 14 when the power generation system 10 is operated in the active power mode, and to monitor and/or control the reactive power generated by or absorbed by the synchronous generator 14 when the power generation system 10 is operated in the reactive power mode. It will be appreciated that the controller 72 may be in operable communication with various other components of the power generation system 10 and configured to monitor and/or control such components during operation of the system 10 in the active power mode or the reactive power mode.

During operation of the power generation system 10 in the active power mode, the gas turbine engine 12 may drive the synchronous generator 14 to provide active power to the electric power grid 16. In particular, the gas turbine engine 12 may operate as described above, resulting in rotation of the power rotor shaft 36. The generator rotor shaft 44 may rotate along with the power rotor shaft 36 via the clutch 46 connection therebetween. In this manner, the synchronous generator 14 may generate and deliver active power to the electric power grid 16.

During operation of the power generation system 10 in the reactive power mode, the gas turbine engine 12 may be shut down (i.e., the flow of fuel 32 to the combustor 20 may be stopped such that no combustion takes place) while the synchronous generator 14 acts as a synchronous condenser to generate reactive power for or absorb reactive power from the electric power grid 16. In particular, the controller 72 may direct the gas turbine engine 12 to operate temporarily to accelerate the generator rotor shaft 44 to an operational speed and then shut off the gas turbine engine 12. The clutch 46 connection may allow the power rotor shaft 36 to drive the generator rotor shaft 44 during this startup period and then allow the generator rotor shaft 44 to rotate relative to the power rotor shaft 36 to provide synchronous condensing. In this manner, the synchronous generator 14 may generate reactive power for or absorb reactive power from the electric power grid 16.

As described above, the power generation system 10 may present certain drawbacks. For example, the cost of the clutch 46 may significantly increase the overall cost of the system. Additionally, the clutch 46 may experience significant wear and may present reliability issues over time. Furthermore, in retrofit applications, it may not be possible to install and/or operate the clutch 46 in a limited amount of space available at the operating location. Therefore, the configuration of the power generation system 10 may not be optimal in certain applications.

Figure 2:
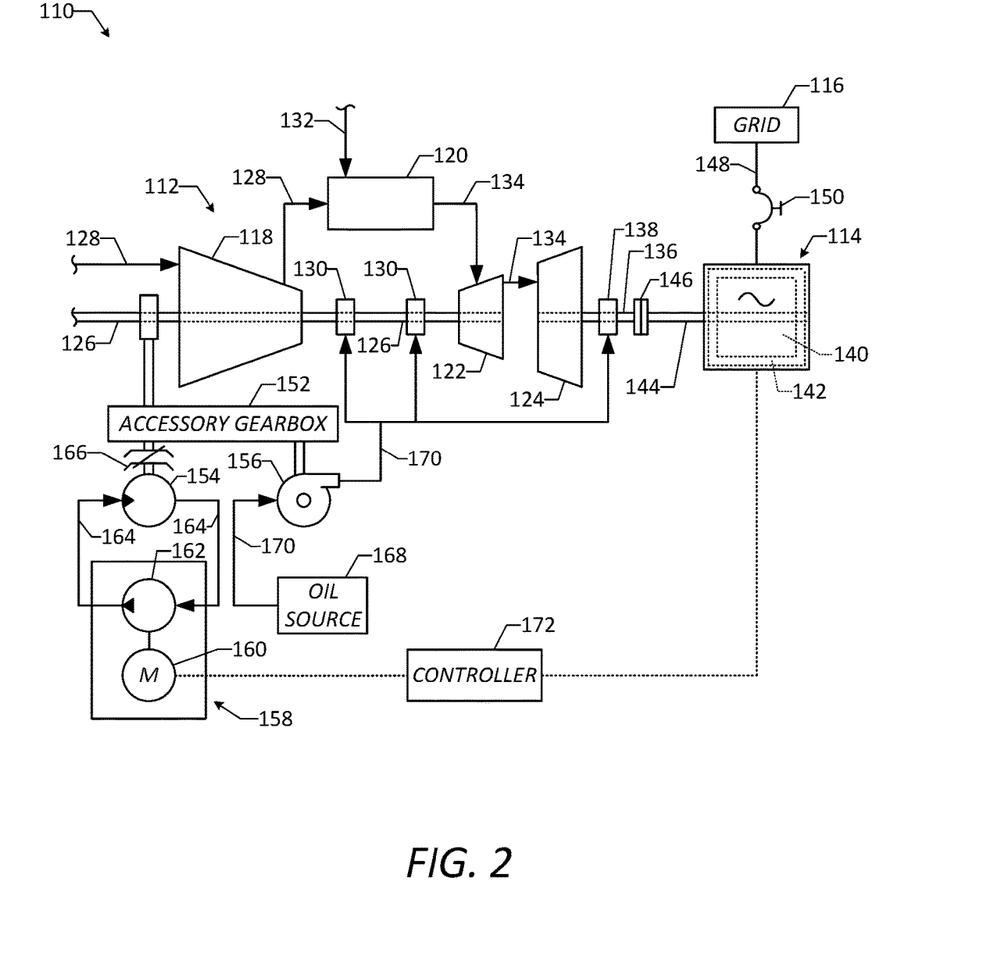
FIG. 2 is a schematic diagram of a gas turbine engine system as may be described herein, the gas turbine engine system including a gas turbine engine and a synchronous generator that may operate as a synchronous condenser.

FIG. 2 shows an embodiment of a power generation system 110 as may be described herein. The power generation system 110 may include a gas turbine engine 112 coupled to a synchronous generator 114 (which also may be referred to as a "synchronous condenser"). As described below, the power generation system 110 may be operated in an active power mode or a reactive power mode. In the active power mode, the system 110 may provide active power (watts) to an electric power grid 116, and in the reactive power mode, the system 110 may generate reactive power (vars) for or absorb reactive power from the electric power grid 116. In this manner, the synchronous generator 114 may operate as a synchronous generator in the active power mode and may operate as a synchronous condenser in the reactive power mode. Other components and other configurations of the power generation system 110 may be used. As described below, the power generation system 110 may eliminate the need for a clutch connection between the gas turbine engine 112 and the synchronous generator 114 while adequately managing the gas turbine engine 112 while the synchronous generator 114 operates as a synchronous condenser.

The gas turbine engine 112 may be an aeroderivative TM2500, LM2500, LM6000, or LMS100 gas turbine engine, although other types of gas turbine engines may be used. As shown, the gas turbine engine 112 may include a compressor 118, a combustor 120, a core turbine 122 (which also may be referred to as a "high pressure turbine"), and a power turbine 124 (which also may be referred to as a "free turbine" or a "low pressure turbine"). The compressor 118 may be positioned about a core rotor shaft 126 and configured to receive an incoming flow of air 128. The core rotor shaft 126 may be rotatably supported by one or more bearings 130, as shown. The compressor 118 may include a number of stages each having a number of stator vanes positioned about the core rotor shaft 126 and a number of blades configured to rotate with the core rotor shaft 126. The compressor 118 may be configured to compress the incoming flow of air 128 and to deliver the compressed flow of air 128 to the combustor 120. The combustor 120 may be configured to mix the compressed flow of air 128 with a pressurized flow of fuel 132 received from a fuel source and to ignite the mixture to create a flow of combustion gases 134. Although only a single combustor 120 is shown, the gas turbine engine 112 may include any number of combustors 120. The combustor 120 may be configured to deliver the flow of combustion gases 134 to the core turbine 122. The core turbine 122 may include a number of stages each having a number of stator vanes positioned about the core rotor shaft 126 and a number of blades configured to rotate with the core rotor shaft 126. The core turbine 122 may be driven by the flow of combustion gases 134 so as to produce mechanical work and may direct the flow of combustion gases 134 to the power turbine 124. The power turbine 124 may be positioned about a power rotor shaft 136 and configured to receive the flow of combustion gases 134 from the core turbine 122. The power rotor shaft 136 may be rotatably supported by one or more bearings 138, as shown. The power turbine 124 may include a number of stages each having a number of stator vanes positioned about the power rotor shaft 136 and a number of blades configured to rotate with the power rotor shaft 136. The power turbine 124 may be driven by the flow of combustion gases 134 so as to produce mechanical work. The mechanical work produced by the power turbine 124 may drive the synchronous generator 114 when the power generation system 110 is operated in the active power mode. Other components and other configurations of the gas turbine engine 112 may be used.

The gas turbine engine 112 may use natural gas, various types of syngas, and/or other types of fuels. The gas turbine engine 112 may be any one of a number of different gas turbine engines offered by General Electric Company of Schenectady, N.Y., including, but not limited to, those such as the LMS100 gas turbine, the LM2500 gas turbine, the TM2500 gas turbine, or the LM6000 gas turbine and the like. The gas turbine engine 112 may have different configurations and may use other types of components. Other types of gas turbine engines also may be used herein. Multiple gas turbine engines, other types of turbines, and other types of power generation equipment also may be used herein together. Although the gas turbine engine 112 is shown, the present application may be applicable to any type of turbo machinery.

The synchronous generator 114 may include a generator rotor 140 mounted within a generator stator 142, and a generator rotor shaft 143 coupled to the generator rotor 140 and configured to rotate therewith. The generator rotor 140 may be wrapped in field windings, and the generator stator 142 may be wrapped in armature windings. The synchronous generator 114 may be coupled to the gas turbine engine 112 via a coupling 146. In particular, the coupling 146 may couple the generator rotor shaft 144 to the power rotor shaft 136, as shown. The coupling 146 may be configured such that the generator rotor shaft 144 may be driven by and rotate with the power rotor shaft 136 when the power generation system 110 is operated in the active power mode, and such that the power rotor shaft 136 may be driven by and rotate with the generator rotor shaft 144 when the power generation system 110 is operated in the reactive power mode. The coupling 146 may be any type of mechanism that securely connects the power rotor shaft 136 and the generator rotor shaft 144 to one another for simultaneous rotation. The synchronous generator 114 may be in communication with the electric power grid 116 via a power line 148 and a generator circuit breaker 150. When the power generation system 110 is operated in the active power mode, the synchronous generator 114 may operate as a synchronous generator and provide active power to the electric power grid 116. When the power generation system 110 is operated in the reactive power mode, the synchronous generator 114 may operate as a synchronous condenser and generate reactive power for or absorb reactive power from the electric power grid 116.

As shown, the power generation system 110 may include an accessory gearbox 152 configured to drive one or more accessory features of the gas turbine engine 112, the synchronous generator 114, and/or other portions of the system 110. For example, the accessory gearbox 152 may be used to facilitate startup of the gas turbine engine 112 and/or to facilitate delivery of lubricating oil to various portions of the gas turbine engine 112. As shown, the power generation system 110 may include a hydraulic motor 154 mounted to one pad of the accessory gearbox 152 and a lubricating oil pump 156 mounted to another pad of the accessory gearbox 152. As described below, the accessory gearbox 152 also may be used, while the power generation system 110 is operated in the reactive power mode, to rotate the core rotor shaft 126 and to provide necessary lubrication to the bearings 130, 138.

The hydraulic motor 154 may be in communication with a motor-pump assembly 158 configured to drive the hydraulic motor 154. As shown, the motor-pump assembly 158 may include an electric motor 160 coupled to and configured to drive a hydraulic pump 162. When the hydraulic pump 162 is driven by the electric motor 160, a flow of hydraulic fluid 164 may circulate between the hydraulic pump 162 and the hydraulic motor 154 such that the motor 154 is driven by the pump 162. The hydraulic motor 154, in turn, may drive the accessory gearbox 152 which may operate the one or more accessories mounted thereto. The accessory gearbox 152 may facilitate startup of the gas turbine engine 112 by rotating the core rotor shaft 126 to an igniting speed for operation of the power generation system 110 in the active power mode and also may facilitate management of the gas turbine engine 112 by rotation the core rotor shaft 126 at a speed within a predetermined range during operation of the power generation system 110 in the reactive power mode. As shown, a clutch 166 may be positioned between the hydraulic motor 154 and the core rotor shaft 126. The clutch 166 may be configured to disengage when the speed of the core rotor shaft 126 is greater than the speed of the hydraulic motor 154. In particular, the clutch 166 may be configured to disengage when the speed of the core rotor shaft 126 reaches a predetermined windmilling speed, which may be between 1000 rpm and 2500 rpm. The accessory gearbox 152 also may drive the lubricating oil pump 156.

The lubricating oil pump 156 may be in communication with a lubricating oil source 168 and configured to pump and receive a flow of lubricating oil 170 therefrom. Various types of lubricating oil may be used. As shown, the lubricating oil pump 156 also may be in communication with the bearings 130 supporting the core rotor shaft 126 and the bearings 138 supporting the power rotor shaft 136. When the lubricating oil pump 156 is driven by the accessory gearbox 152, the lubricating oil pump 156 may deliver the lubricating oil 170 to the bearings 130, 138 in order to lubricate and remove heat from the bearings 130, 138 while the core rotor shaft 126 and the power rotor shaft 136 rotate. The lubricating oil pump 156 may be a mechanical pump, although other types of pumps may be used.

As shown, the power generation system 110 also may include an electronic controller 172 in operable communication with various components of the system 110. For example, the controller 172 may be in operable communication with the electric motor 160 and configured to control an operating state (i.e., an on state or an off state) and/or an operating speed of the motor 160. In this manner, the controller 172 may be operable to control the hydraulic motor 154 and the accessory gearbox 152 during startup of the gas turbine engine 112 when the power generation system 110 is operated in the active power mode and also during management of the gas turbine engine 112 when the power generation system 110 is operated in the reactive power mode. Additionally, the controller 172 may be operable to control the lubricating oil pump 156 for delivery of the lubricating oil 170 during operation of the gas turbine engine 112 when the power generation system 110 is operated in the active power mode and also during management of the gas turbine engine 112 when the power generation system 110 is operated in the reactive power mode. The controller 171 also may be in operable communication with the synchronous generator 114 and configured to control operations thereof. In this manner, the controller 172 may be operable to monitor and/or control the active power generated by the synchronous generator 114 when the power generation system 110 is operated in the active power mode, and to monitor and/or control the reactive power generated by or absorbed by the synchronous generator 114 when the power generation system 110 is operated in the reactive power mode. It will be appreciated that the controller 172 may be in operable communication with various other components of the power generation system 110 and configured to monitor and/or control such components during operation of the system 110 in the active power mode or the reactive power mode.

During operation of the power generation system 110 in the active power mode, the gas turbine engine 112 may drive the synchronous generator 114 to provide active power to the electric power grid 116. In particular, the gas turbine engine 112 may operate as described above, resulting in rotation of the power rotor shaft 136. The generator rotor shaft 144 may rotate along with the power rotor shaft 136 via the coupling 146 connection therebetween. In this manner, the synchronous generator 114 may generate and deliver active power to the electric power grid 116.

During operation of the power generation system 110 in the reactive power mode, the gas turbine engine 112 may be shut down (i.e., the flow of fuel 132 to the combustor 120 may be stopped such that no combustion takes place) while the synchronous generator 114 acts as a synchronous condenser to generate reactive power for or absorb reactive power from the electric power grid 116. In particular, the controller 172 may direct the gas turbine engine 112 to operate temporarily to accelerate the generator rotor shaft 144 to a synchronous operational speed and then shut off the gas turbine engine 112. The coupling 146 connection may allow the power rotor shaft 136 to drive the generator rotor shaft 144 during this startup period and then allow the generator rotor shaft 144 to rotate with and drive the power rotor shaft 136 while providing synchronous condensing. In this manner, the synchronous generator 14 may generate reactive power for or absorb reactive power from the electric power grid 16. During operation of the power generation system 110 in the reactive power mode, the controller 172 may direct the electric motor 160 to continue operating in an on state and at a predetermined operating speed, such that the electric motor 160 continues to drive the hydraulic pump 162, the hydraulic pump 162 continues to drive the hydraulic motor 154, the hydraulic motor 154 continues to drive the accessory gearbox 152, and the accessory gearbox 152 continues to drive the lubricating oil pump 156 and to rotate the core rotor shaft 126. Accordingly, the controller 172 may cause the core rotor shaft 126 to rotate at an operating speed within a predetermined range during operation of the power generation system 110 in the reactive power mode. In this manner, the controller 172 may prevent the core rotor shaft 126 from freely rotating as it otherwise may due to the wind-milling effect that may be created by rotation of the power rotor shaft 136. In certain embodiments, the predetermined range may be between 1000 rpm and 2500 rpm. The controller 172 also may cause the lubricating oil pump 156 to continue to deliver the lubricating oil 170 to the bearings 130, 138 in order to lubricate and remove heat from the bearings 130, 138 during rotation of the core rotor shaft 126 and the power rotor shaft 136. The controller 172 may cause the hydraulic motor 154 and the hydraulic pump 162 to turn off and disengage if the core windmilling speed is greater than 1000 rpm.

The power generation system 110 and related methods described herein thus provide improved systems and methods for power generation synchronous condensing using a gas turbine engine and a synchronous generator. As described above, the controller 172 may allow the system 110 to operate in a reactive power mode in which the controller 172 causes the core rotor shaft 126 to continue to rotate at an operating speed within a predetermined range and also causes the lubricating oil pump 156 to continue to deliver the lubricating oil 168 to the bearings 130, 138. In this manner, the power generation system 110 and methods described herein may eliminate the need for a clutch connection between the power rotor shaft 136 and the generator rotor shaft 144, as the power rotor shaft 136 and the generator rotor shaft 144 rotate with one another, via the coupling 146 connection, during operation of the system 110 in the reactive power mode. By eliminating the need for a clutch, the power generation system 110 and methods described herein thus may enable synchronous condensing function with no or minimal additional hardware. In this manner, synchronous condensing function may be provided, either upon original manufacture or as a retrofit, at no or minimal added cost. In retrofit applications, the software of the controller 172 may simply be updated to provide the above-described functions when the system 110 operates in the reactive power mode. Furthermore, the power generation system 110 and methods described herein may provide a simple approach to power generation synchronous condensing which avoids potential reliability issues associated with existing approaches.

It should be apparent that the foregoing relates only to certain embodiments of the present application. Numerous changes and modifications may be made herein by one of ordinary skill in the art without departing from the general spirit and scope of the invention as defined by the following claims and the equivalents thereof.

We claim:

1. A power generation system, comprising:
a core turbine positioned about a core rotor shaft;
a power turbine positioned about a power rotor shaft;
a synchronous generator comprising a generator rotor shaft coupled to the power rotor shaft for rotation therewith, the synchronous generator configured to generate reactive power for or absorb reactive power from an electric power grid when the power generation system operates in a reactive power mode;
an electronic controller in operable communication with the synchronous generator, the electronic controller operable to cause the core rotor shaft to rotate when the power generation system operates in the reactive power mode;
one or more bearings supporting the core rotor shaft or the power rotor shaft; and
a lubricating oil pump in communication with the one or more bearings;
wherein the generator rotor shaft is coupled to the power rotor shaft via a coupling configured for simultaneous rotation such that the generator rotor shaft is driven by and rotates with the power rotor shaft when the power generation system operates in an active power mode and such that the power rotor shaft is driven by and rotates with the generator rotor shaft when the power generation system operates in the reactive power mode; and
wherein the electronic controller is operable to cause the lubricating oil pump to direct lubricating oil to the one or more bearings when the power generation system operates in the reactive power mode.

2. The power generation system of claim 1, further comprising an accessory gearbox in communication with the core rotor shaft and configured to rotate the core rotor shaft, wherein the electronic controller is operable to drive the accessory gearbox when the power generation system operates in the reactive power mode.

3. The power generation system of claim 2, wherein the electronic controller is operable to drive the accessory gearbox when the power generation system operates in an active power mode.

4. The power generation system of claim 2, further comprising a hydraulic motor mounted to the accessory gearbox and configured to drive the accessory gearbox, wherein the electronic controller is operable to drive the hydraulic motor when the power generation system operates in the reactive power mode, and wherein the electronic controller is operable to turn off the hydraulic motor if a speed of the core rotor shaft reaches a predetermined windmilling speed between 1000 rpm and 2500 rpm.

5. The power generation system of claim 4, further comprising:
a hydraulic pump in communication with the hydraulic motor and configured to drive the hydraulic motor; and
an electric motor in communication with the hydraulic pump and configured to drive the hydraulic pump;
wherein the electronic controller is operable to drive the electric motor when the power generation system operates in the reactive power mode.

6. The power generation system of claim 2, wherein the lubricating oil pump is mounted to the accessory gearbox and is configured to be driven by the accessory gearbox when the power generation system operates in the reactive power mode.

7. The power generation system of claim 6, wherein the one or more bearings comprises:
a first bearing supporting the core rotor shaft; and
a second bearing supporting the power rotor shaft.

8. The power generation system of claim 1, wherein the electronic controller is operable to cause the lubricating oil pump to direct the lubricating oil to the one or more bearings when the power generation system operates in an active power mode.

9. The power generation system of claim 1, further comprising:
a compressor positioned about the core rotor shaft; and
a combustor in communication with the compressor and the core turbine, the combustor configured to receive a flow of air from the compressor and a flow of fuel from a fuel source, to mix the air and the fuel, and to ignite the mixture to create a flow of combustion gases;
wherein the electronic controller is operable to discontinue the flow of fuel to the combustor when the power generation system operates in the reactive power mode.

10. A method for operating a power generation system, the method comprising:
providing a gas turbine engine comprising a core turbine positioned about a core rotor shaft, and a power turbine positioned about a power rotor shaft;
operating a synchronous generator as a synchronous condenser to generate reactive power for or absorb reactive power from an electric power grid, the synchronous generator comprising a generator rotor shaft coupled to the power rotor shaft via a coupling for simultaneous rotation therewith such that the power rotor shaft is driven by and rotates with the generator rotor shaft when the synchronous generator operates as the synchronous condenser;
directing, via an electronic controller, the core rotor shaft to rotate while the synchronous generator operates as the synchronous condenser;
supporting the core rotor shaft or the power rotor shaft with one or more bearings in communication with a lubricating oil pump; and
directing, via the electronic controller, the lubricating oil pump to deliver lubricating oil to the one or more bearings while the synchronous generator operates as the synchronous condenser.

11. The method of claim 10, wherein the core rotor shaft is rotated by an accessory gearbox in communication with the core rotor shaft.

12. A power generation system, comprising:
a gas turbine engine comprising:
a core turbine positioned about a core rotor shaft;
a power turbine positioned about a power rotor shaft;
one or more bearings supporting the core rotor shaft or the power rotor shaft; and
a lubricating oil pump configured to deliver lubricating oil to the one or more bearings;
a synchronous generator comprising a generator rotor shaft coupled to the power rotor shaft for rotation therewith, the synchronous generator configured to generate reactive power for or absorb reactive power from an electric power grid when the power generation system operates in a reactive power mode; and
an electronic controller in operable communication with the synchronous generator, the electronic controller operable to cause the lubricating oil pump to deliver the lubricating oil to the one or more bearings when the power generation system operates in the reactive power mode and to cause the core rotor shaft to rotate when the power generation system operates in the reactive power mode;
wherein the generator rotor shaft is coupled to the power rotor shaft via a coupling for simultaneous rotation such that the generator rotor shaft is driven by and rotates with the power rotor shaft when the power generation system operates in an active power mode and such that the power rotor shaft is driven by and rotates with the generator rotor shaft when the power generation system operates in the reactive power mode.

13. The power generation system of claim 12, further comprising:
an accessory gearbox in communication with the core rotor shaft, the accessory gearbox configured to rotate the core rotor shaft and to drive the lubricating oil pump; and
a hydraulic motor mounted to the accessory gearbox and configured to drive the accessory gearbox;
wherein the electronic controller is operable to drive the hydraulic motor when the power generation system operates in the reactive power mode; and
wherein the electronic controller is operable to turn off the hydraulic motor if a speed of the core rotor shaft reaches a predetermined windmilling speed between 1000 rpm and 2500 rpm.

14. The power generation system of claim 13, further comprising:
a hydraulic pump in communication with the hydraulic motor and configured to drive the hydraulic motor; and
an electric motor in communication with the hydraulic pump and configured to drive the hydraulic pump;
wherein the electronic controller is operable to drive the electric motor when the power generation system operates in the reactive power mode.

15. The power generation system of claim 12, wherein the gas turbine engine further comprises:
a compressor positioned about the core rotor shaft; and a combustor in communication with the compressor and the core turbine, the combustor configured to receive a flow of air from the compressor and a flow of fuel from a fuel source, to mix the air and the fuel, and to ignite the mixture to create a flow of combustion gases;

wherein the electronic controller is operable to discontinue the flow of fuel to the combustor when the power generation system operates in the reactive power mode.

\* \* \* \* \*